US006957254B1

(12) United States Patent
Iterum et al.

(10) Patent No.: US 6,957,254 B1
(45) Date of Patent: Oct. 18, 2005

(54) METHOD AND APPARATUS FOR REACHING AGREEMENT BETWEEN NODES IN A DISTRIBUTED SYSTEM

(75) Inventors: Skef F. Iterum, San Francisco, CA (US); Declan J. Murphy, San Francisco, CA (US)

(73) Assignee: Sun Microsystems, Inc, Santa Clara, CA (US)

( * ) Notice: Subject to any disclaimer, the term of this patent is extended or adjusted under 35 U.S.C. 154(b) by 987 days.

(21) Appl. No.: 09/662,553

(22) Filed: Sep. 15, 2000

Related U.S. Application Data

(60) Provisional application No. 60/160,992, filed on Oct. 21, 1999.

(51) Int. Cl.[7] ........................................... G06F 15/177
(52) U.S. Cl. ........................ 709/221; 709/228; 709/248
(58) Field of Search ............................... 709/226, 224, 709/223, 209, 208, 227–228, 220–221, 248; 709/205; 707/10; 700/105, 203; 714/4, 2, 714/48

(56) References Cited

U.S. PATENT DOCUMENTS

| 5,526,492 A | | 6/1996 | Ishida ................... 395/200.09 |
| 5,793,968 A | | 8/1998 | Gregerson et al. ..... 395/200.39 |
| 5,862,348 A | * | 1/1999 | Pedersen ................... 709/229 |
| 6,014,700 A | * | 1/2000 | Bainbridge et al. ......... 709/226 |
| 6,119,162 A | * | 9/2000 | Li et al. ..................... 709/227 |

(Continued)

FOREIGN PATENT DOCUMENTS

| EP | 0 750 256 A2 | 12/1996 | ............. G06F 9/46 |
| WO | WO 97/49039 | 12/1997 | ........... G06F 13/00 |

OTHER PUBLICATIONS

Publication, entitled "Fault-Tolerance in Air Traffic Control Systems," to Flaviu Cristian, Bob Dancey and Jon Dehn, ACM Transactions on Computer Systems, vol. 14, No. 3, Aug. 1996, pp. 265-286, XP 000638951.

(Continued)

*Primary Examiner*—Abdullahi E. Salad
(74) *Attorney, Agent, or Firm*—Park, Vaughan & Fleming LLP

(57) ABSTRACT

One embodiment of the present invention provides a system for selecting a node to host a primary server for a service from a plurality of nodes in a distributed computing system. The system operates by receiving an indication that a state of the distributed computing system has changed. In response to this indication, the system determines if there is already a node hosting the primary server for the service. If not, the system selects a node to host the primary server using the assumption that a given node from the plurality of nodes in the distributed computing system hosts the primary server. The system then communicates rank information between the given node and other nodes in the distributed computing system, wherein each node in the distributed computing system has a unique rank with respect to the other nodes in the distributed computing system. The system next compares the rank of the given node with the rank of the other nodes in the distributed computing system. If one of the other nodes has a higher rank than the given node, the system disqualifies the given node from hosting the primary server.

37 Claims, 5 Drawing Sheets

U.S. PATENT DOCUMENTS

| | | | |
|---|---|---|---|
| 6,185,619 B1 * | 2/2001 | Joffe et al. | 709/229 |
| 6,240,454 B1 * | 5/2001 | Nepustil | 709/229 |
| 6,292,905 B1 * | 9/2001 | Wallach et al. | 714/4 |
| 6,363,416 B1 * | 3/2002 | Naeimi et al. | 709/209 |
| 6,381,627 B1 * | 4/2002 | Kwan et al. | 709/201 |
| 6,609,213 B1 * | 8/2003 | Nguyen et al. | 714/4 |
| 6,650,621 B1 * | 11/2003 | Maki-Kullas | 370/238 |

OTHER PUBLICATIONS

Publication, entitled "A Service Acquisition Mechanism for Server-Based Heterogeneous Distributed Systems," to Rong N. Chang and Chinya V. Ravishankar, 8354 IEEE Transactions on Parallel and Distributed Systems, Feb. 5, 1994, No. 2, New York, US, pp. 154-169.

* cited by examiner

METHOD AND APPARATUS FOR REACHING AGREEMENT BETWEEN NODES IN A DISTRIBUTED SYSTEM

RELATED APPLICATION

This application hereby claims priority under 35 U.S.C. § 119 to U.S. Provisional Patent Application No. 60/160,992 filed on Oct. 21, 1999, entitled "Distributed Multi-Tier Mechanism for Agreement."

BACKGROUND

1. Field of the Invention

The present invention relates to coordinating activities between nodes in a distributed computing system. More specifically, the present invention relates to a method and an apparatus for reaching agreement between nodes in the distributed computing system regarding a node to function as a primary provider for a service.

2. Related Art

As computer networks are increasingly used to link computer systems together, distributed computing systems have been developed to control interactions between computer systems. Some distributed computing systems allow client computer systems to access resources on server computer systems. For example, a client computer system may be able to access information contained in a database on a server computer system.

When a server computer system fails, it is desirable for the distributed computing system to automatically recover from this failure. Distributed computer systems possessing an ability to recover from such server failures are referred to as "highly available systems."

For a highly available system to function properly, the highly available system must be able to detect a server failure and reconfigure itself so that accesses to a failed server are redirected to a backup secondary server.

One problem in designing such a highly available system is that some distributed computing system functions must be centralized in order to operate efficiently. For example, it is desirable to centralize an arbiter that keeps track of where primary and secondary copies of a server are located in a distributed computing system. However, a node that hosts such a centralized arbiter may itself fail. Hence, it is necessary to provide a mechanism to select a new node to host the centralized arbiter.

Moreover, this selection mechanism must operate in a distributed fashion because, for the reasons stated above, no centralized mechanism is certain to continue functioning. Furthermore, it is necessary for the node selection process to operate so that the nodes that remain functioning in the distributed computing system agree on the same node to host the centralized arbiter. For efficiency reasons, it is also desirable for the node selection mechanism not to move the centralized arbiter unless it is necessary to do so.

Hence, what is needed is a method and an apparatus that operates in a distributed manner to select a node to host a primary server for a service.

SUMMARY

One embodiment of the present invention provides a system for selecting a node to host a primary server for a service from a plurality of nodes in a distributed computing system. The system operates by receiving an indication that a state of the distributed computing system has changed. In response to this indication, the system determines if there is already a node hosting the primary server for the service. If not, the system selects a node to host the primary server using the assumption that a given node from the plurality of nodes in the distributed computing system hosts the primary server. The system then communicates rank information between the given node and other nodes in the distributed computing system, wherein each node in the distributed computing system has a unique rank with respect to the other nodes in the distributed computing system. The system next compares the rank of the given node with the rank of the other nodes in the distributed computing system. If one of the other nodes has a higher rank than the given node, the system disqualifies the given node from hosting the primary server.

In one embodiment of the present invention, if there exists a node to host the primary server, the system allows the node that hosts the primary server to communicate with other nodes in the distributed computing system in order to disqualify the other nodes from hosting the primary server.

In one embodiment of the present invention, the system maintains a candidate variable in the given node identifying a candidate node to host the primary server. In a variation on this embodiment, the system initially sets the candidate variable to identify the given node.

In one embodiment of the present invention, after a new node has been selected to host the primary server, if the new node is different from a previous node that hosted the primary server, the system maps connections for the service to the new node. In a variation on this embodiment, the system also configures the new node to host the primary server for the service.

In one embodiment of the present invention, the system restarts the service if the service was interrupted as a result of the change in state of the distributed computing system.

In one embodiment of the present invention, the given node in the distributed computing system can act as one of: a host for the primary server for the service; a host for a secondary server for the service, wherein the secondary server periodically receives checkpointing information from the primary server; or a spare for the primary server, wherein the spare does not receive checkpointing information from the primary server.

In one embodiment of the present invention, upon initial startup of the service, the system selects a highest ranking spare to host the primary server for the service.

In one embodiment of the present invention, the system allows the primary server to configure spares in the distributed computing system to host secondary servers for the service.

In one embodiment of the present invention, comparing the rank of the given node with the rank of the other nodes in the distributed computing system involves considering a host for a secondary server to have a higher rank than a spare.

In one embodiment of the present invention, after disqualifying the given node from hosting the primary server, the system ceases to communicate rank information between the given node and the other nodes in the distributed computing system.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

The data structures and code described in this detailed description are typically stored on a computer readable storage medium, which may be any device or medium that can store code and/or data for use by a computer system. This includes, but is not limited to, magnetic and optical storage devices such as disk drives, magnetic tape, CDs (compact discs) and DVDs (digital versatile discs or digital video discs), and computer instruction signals embodied in a transmission medium (with or without a carrier wave upon which the signals are modulated). For example, the transmission medium may include a communications network, such as the Internet.

Distributed Computing System

Figure 1:
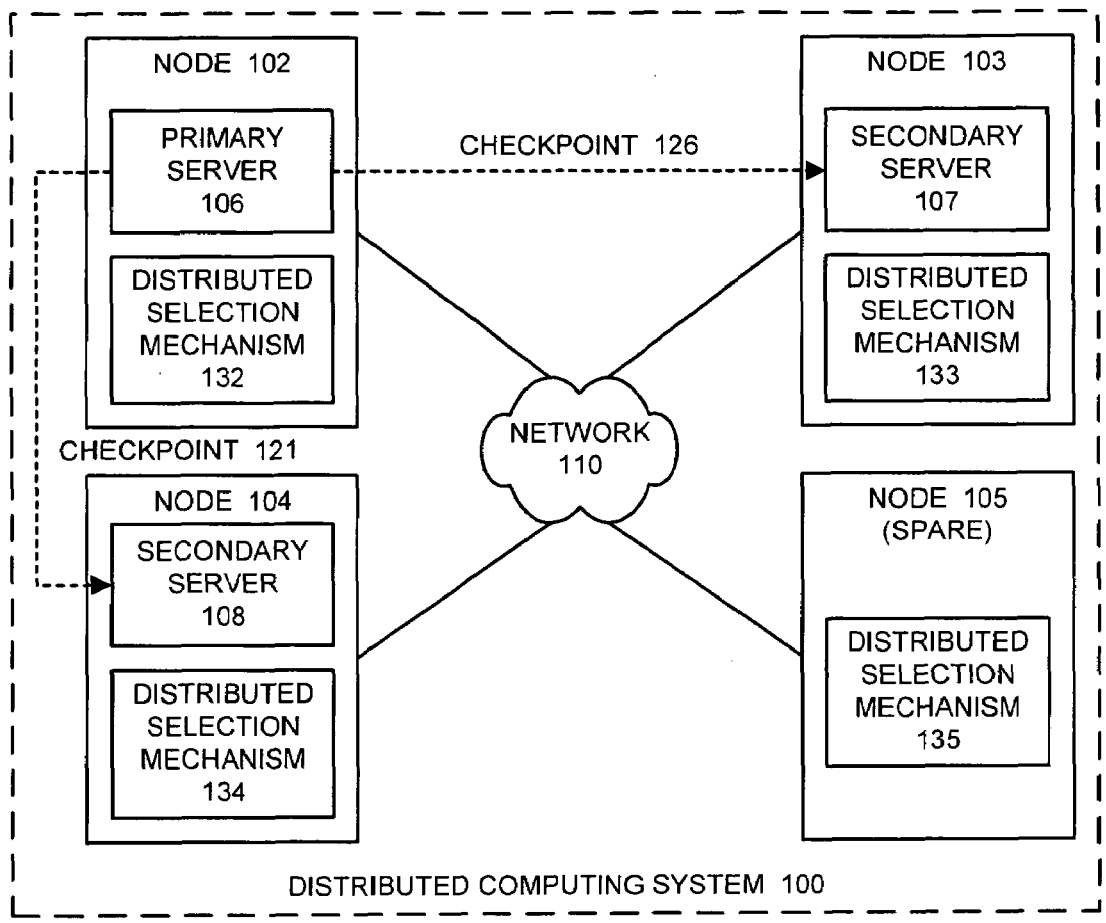
FIG. 1 illustrates a distributed computing system in accordance with an embodiment of the present invention.

FIG. 1 illustrates a distributed computing system 100 in accordance with an embodiment of the present invention. Distributed computing system 100 includes a number of computing nodes 102–105, which are coupled together through a network 110.

Network 110 can include any type of wire or wireless communication channel capable of coupling together computing nodes. This includes, but is not limited to, a local area network, a wide area network, or a combination of networks. In one embodiment of the present invention, network 110 includes the Internet. In another embodiment of the present invention, network 110 is a local high speed network that enables distributed computing system 100 to function as a clustered computing system (hereinafter referred to as a "cluster").

Nodes 102–105 can generally include any type of computer system, including, but not limited to, a computer system based on a microprocessor, a mainframe computer, a digital signal processor, a personal organizer, a device controller, and a computational engine within an appliance.

Nodes 102–105 also host servers, which include a mechanism for servicing requests from a client for computational and/or data storage resources. More specifically, node 102 hosts primary server 106, which services requests from clients (not shown) for a service involving computational and/or data storage resources.

Nodes 103–104 host secondary servers 107–108, respectively, for the same service. These secondary servers act as backup servers for primary server 106. To this end, secondary servers 107–108 receive periodic checkpoints 120–121 from primary server 106. These periodic checkpoints enable secondary servers 107–108 to maintain consistent state with primary server 106. This makes it possible for one of secondary servers 107–108 to take over for primary server 106 if primary server 106 fails.

Node 105 can serve as a spare node to host the service provided by primary server 106. Hence, node 105 can be configured to host a secondary server with respect to a service provided by primary server 106. Alternatively, if all primary servers and secondary servers for the service fail, node 105 can be configured to host a new primary server for the service.

Also note that nodes 102–105 contain distributed selection mechanisms 132–135, respectively. Distributed selection mechanisms 132–135 communicate with each other to select a new node to host primary server 106 when node 102 fails or otherwise becomes unavailable. This process is described in more detail below with reference to FIGS. 2–6.

Controlling Highly Available Services

Figure 2:
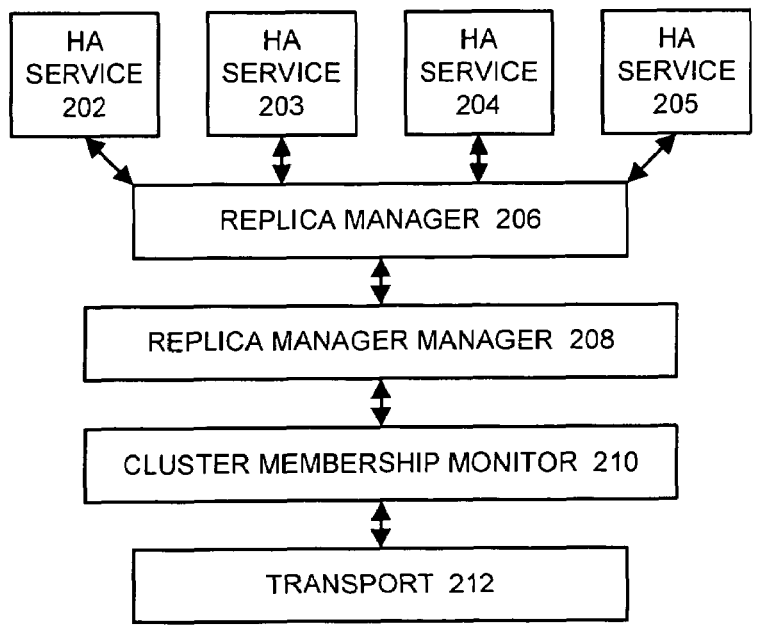
FIG. 2 illustrates how highly available services are controlled within a distributed computing system in accordance with an embodiment of the present invention.

FIG. 2 illustrates how highly available services 202–205 are controlled within distributed computing system 100 in accordance with an embodiment of the present invention. Note that highly available services 202–205 continue to operate even if individual nodes of distributed computing system 100 fail.

Figure 3:
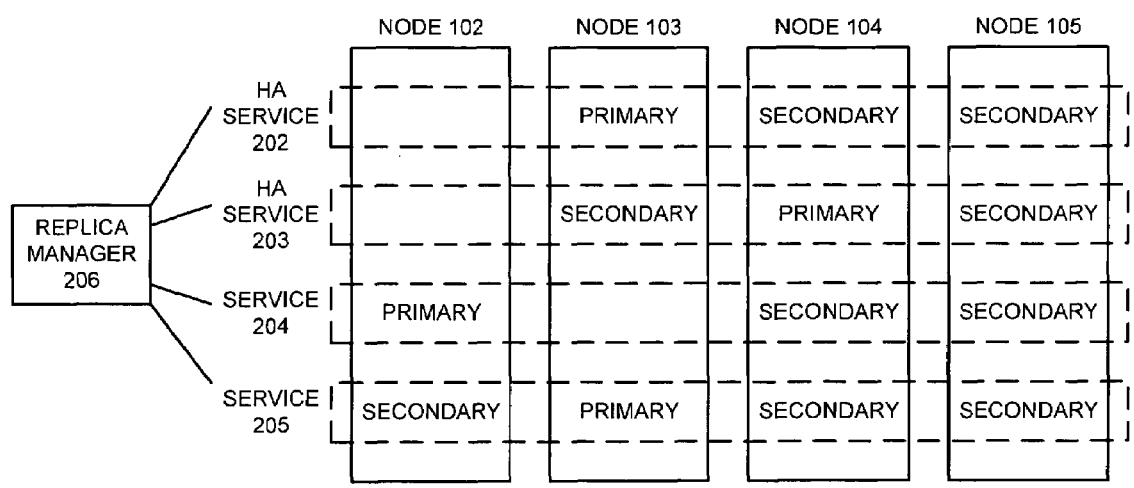
FIG. 3 illustrates how a replica managers controls highly available services in accordance with an embodiment of the present invention.

Highly available services 202–205 operate under control of replica manager 206. Referring to FIG. 3, for each service, replica manager 206 keeps a record of which nodes in distributed computing system 100 function as primary servers, and which nodes function as secondary servers. For example, in FIG. 3 replica manager 206 keeps track of highly available services 202–205. The primary server for service 202 is node 103, and the secondary servers are nodes 104 and 105. The primary server for service 203 is node 104, and the secondary servers are nodes 103 and 105. The primary server for service 204 is node 102, and the secondary servers are nodes 104–105. The primary server for service 205 is node 103, and the secondary servers are nodes 102, 104 and 105.

Replica manager 206 additionally performs a number of related functions, such as configuring a node to host a primary (which may involve demoting a current host for the primary to host a secondary). Replica manager 206 may additionally perform other functions, such as: adding a service; removing providers for a service; registering providers for a service; removing a service; handling provider failures; bringing up new providers for a service; and handling dependencies between services (which may involve ensuring that primaries for dependent services are co-located on the same node).

Referring back to FIG. 2, replica manager 206 is itself a highly available service that operates under control of replica manager manager (RMM) 208. Note that RMM 208 is not managed by a higher level service.

As illustrated in FIG. 2, RMM 208 communicates with cluster membership monitor (CMM) 210. CMM 210 monitors cluster membership and alerts RMM 208 if any changes in the cluster membership occur.

CMM 210 uses transport layer 212 to exchange messages between nodes 102–105.

Process of Selecting a New Primary

Figure 4:
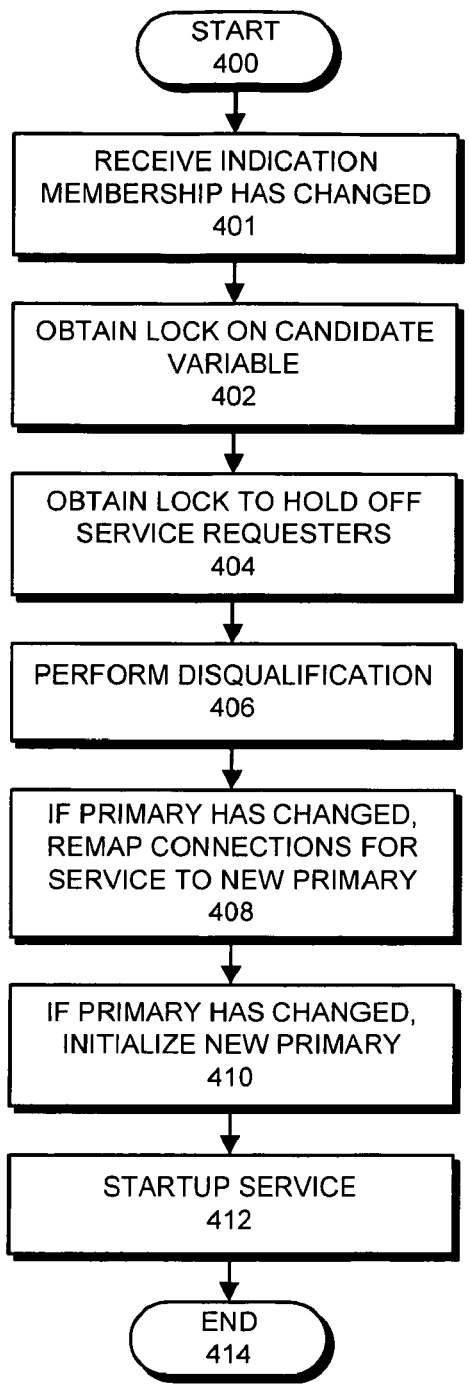
FIG. 4 is a flow chart illustrating the process of selecting and configuring a new primary server in accordance with an embodiment of the present invention.

FIG. 4 is a flow chart illustrating the process of selecting and configuring a primary server in accordance with an embodiment of the present invention. Note that this process is run concurrently by each active node in distributed computing system 100. The system begins by receiving an indication from CMM 210 that the membership in the cluster has changed (step 401).

In response to this indication, the system obtains a lock on a local candidate variable which contains an identifier for a candidate node to host primary server 106 (step 402). The system also obtains an additional lock to hold off requesters for the service (step 404).

Next, the system executes a disqualification process by communicating with other nodes in distributed computing system 100 in order to disqualify the other nodes from acting as the primary server 106 (step 406). This process is described in more detail with reference to FIG. 6 below.

After the disqualification process, the remaining node, which is not disqualified, becomes the primary node. If the node hosting primary server 106 has changed, this may involve re-mapping connections for the service to point to the new node (step 408). It may also involve initializing the new node to act as the host for the primary (step 410).

Finally, the service is started (step 412). This may involve unfreezing the service if it was previously frozen, as well as releasing the previously obtained lock that holds off requesters for the service.

Figure 5:
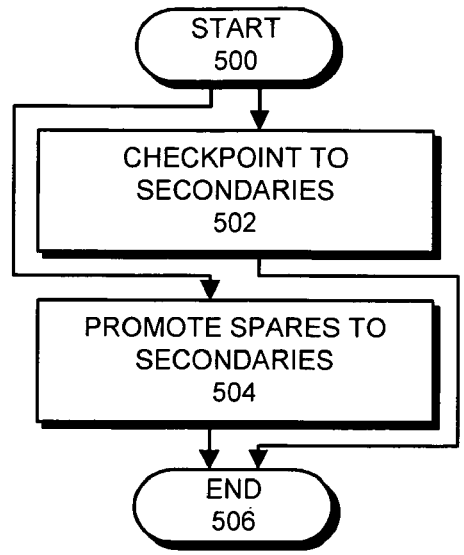
FIG. 5 is a flow chart illustrating some of the operations performed by a primary server in accordance with an embodiment of the present invention.

FIG. 5 is a flow chart illustrating some of the operations performed by a primary server 106 in accordance with an embodiment of the present invention. During operation, primary server 106 performs periodic checkpointing operations 120–121 with secondary servers 107–108, respectively (step 502). These checkpointing operations allow secondary servers 107–108 to take over from primary server 106 if primary server 106 fails. Primary server 106 also periodically attempts to promote spare nodes (such as node 105 in FIG. 1) to host secondaries (step 504). This promotion process involves transferring state information to a spare node in order to bring the spare node up to date with respect to the existing secondaries.

Figure 6:
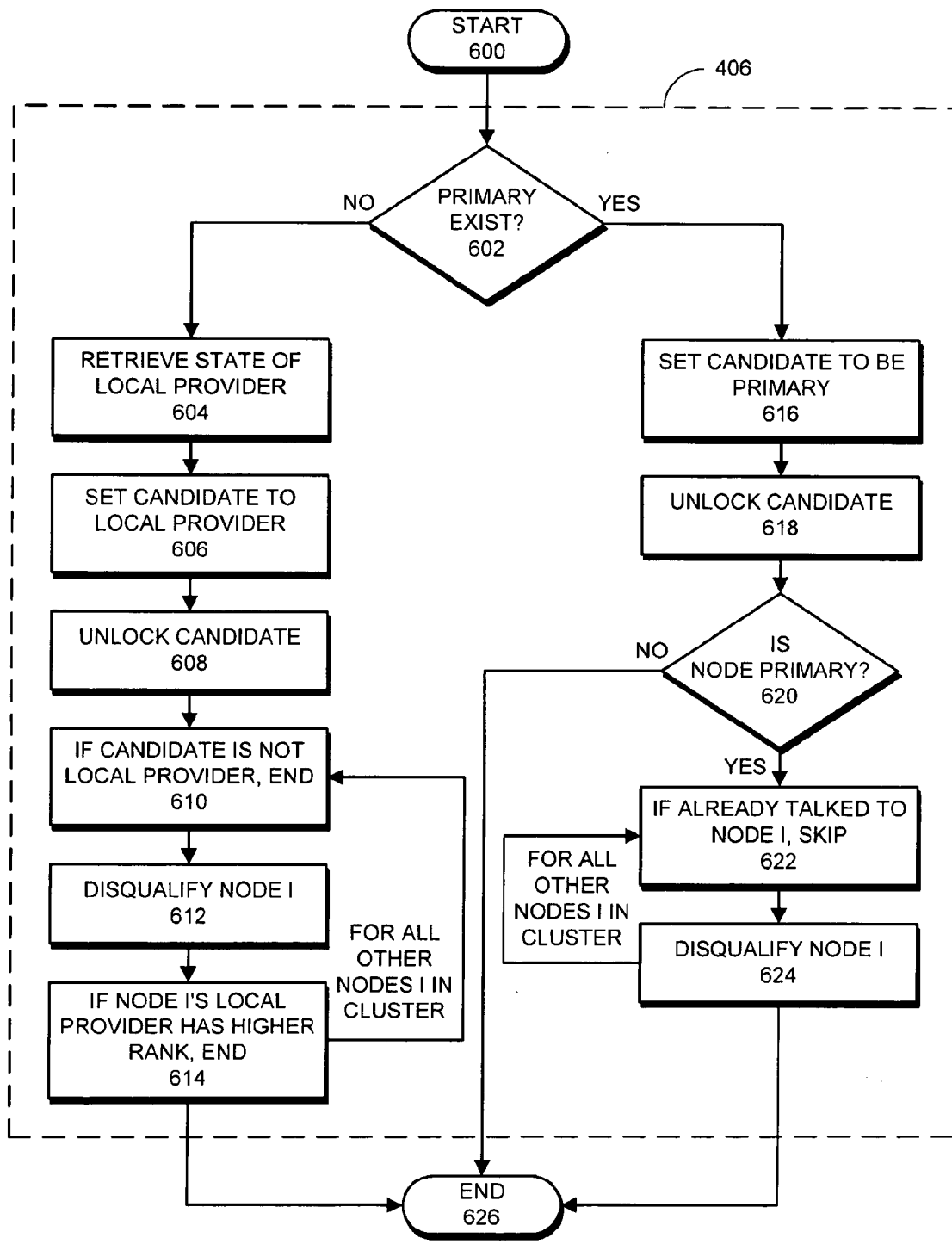
FIG. 6 illustrates how a node is selected to host a primary server through a disqualification process in accordance with an embodiment of the present invention.

FIG. 6 illustrates how a node is selected to host primary server 106 through a disqualification process in accordance with an embodiment of the present invention. Note that FIG. 6 describes in more detail the process described above with reference to step 406 in FIG. 4.

The system starts by determining if a node that was previously hosting primary server 106 continues to exist (step 602).

If not, the system retrieves the state of a local provider for the service (step 604). The system then sets the candidate variable to identify the local provider (step 606), and subsequently unlocks the candidate lock that was set previously in step 402 of FIG. 4 (step 608). Next, if the candidate is not the local provider, the system ends the process (step 610).

Next, for all other nodes I in the cluster, the system attempts to disqualify node I by writing a new identifier into the candidate variable for node I if the rank of node I is less than the rank of the present node (step 612). This process is described in more detail with reference to FIG. 7 below. Finally, if node I's local provider has a higher rank than the present node, the process terminates because the present node is disqualified (step 614).

Note that a rank of a node can be obtained by comparing a unique identifier for the node with unique identifiers for other nodes. Also note that the rank of a primary server is greater than the rank of a secondary server, and that the rank of a secondary server is greater than the rank of a spare. The above-listed restrictions on rank ensure that an existing primary that has not failed continues to function as the primary, and that an existing secondary will be chosen ahead of a spare. Of course, when the system is initialized, no primaries or secondaries exist, so a spare is selected to be the primary.

On the other hand, if the node that was hosting primary server 106 continues to function, the system sets the candidate to be this node (step 616), and unlocks the candidate node (step 618).

If the present node does not host primary server 106, the process is finished. Otherwise, if the present node is hosting primary server 106, the system considers each other node I in the cluster. If the present node has already communicated with I, the system skips node I (step 622). Otherwise, the system communicates with node I in order to disqualify node I from acting as the host for primary server 106 (step 624). This may involve causing an identifier for the present node to be written into the candidate variable for node I.

Figure 7:
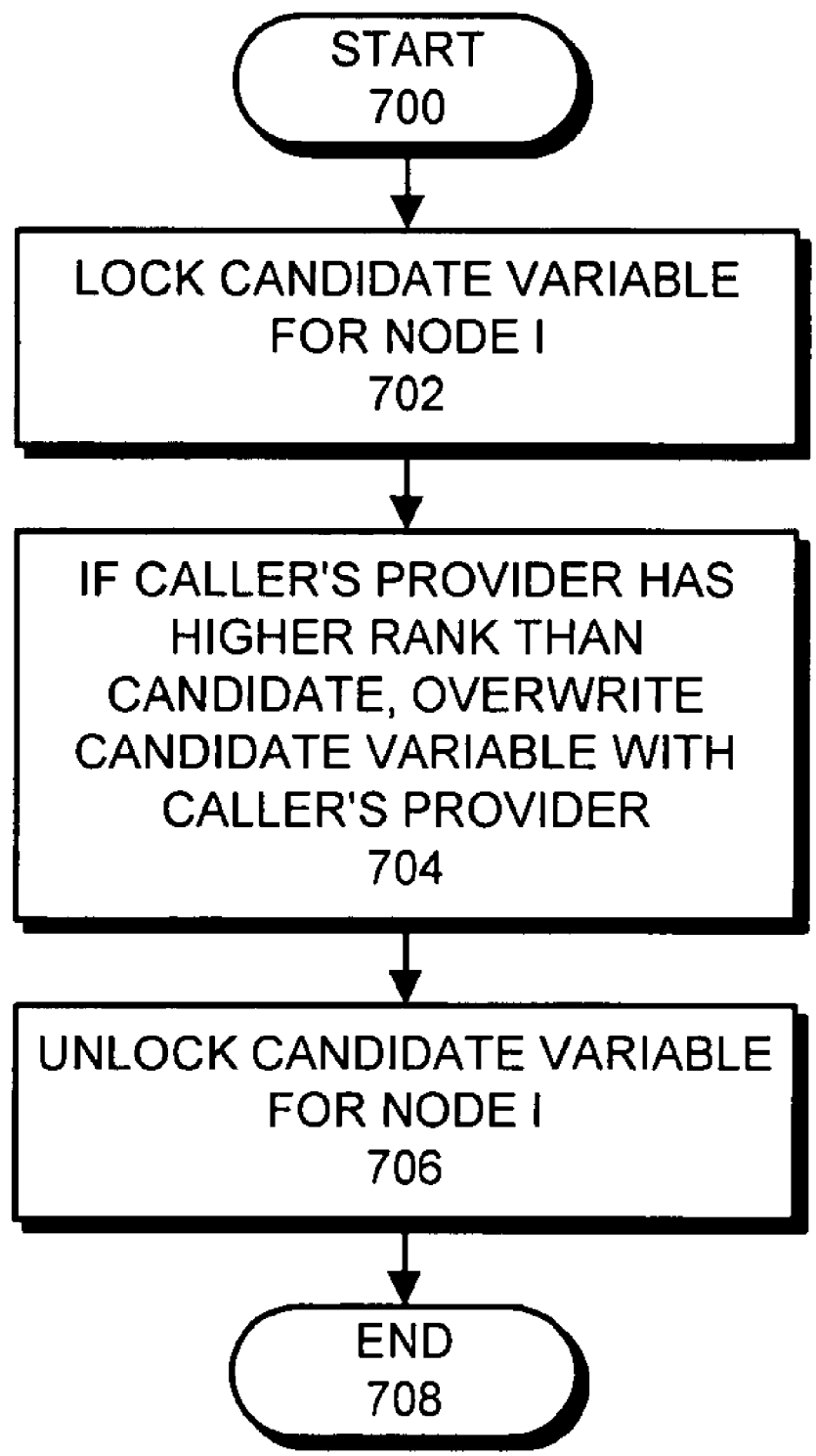
FIG. 7 illustrates how nodes a disqualified in accordance with an embodiment of the present invention.

FIG. 7 illustrates how nodes are disqualified in accordance with an embodiment of the present invention. Note that FIG. 7 describes in more detail the process described above with reference to step 612 in FIG. 6. The caller first locks the candidate variable for node I (step 702). If the caller determines that the caller's provider has a higher rank than is specified in the candidate variable for I, the caller overwrites the candidate variable for I with the caller's provider (step 704). Next, the caller unlocks the candidate variable for I (step 706).

The foregoing descriptions of embodiments of the invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for selecting a node to host a primary server for a service from a plurality of nodes in a distributed computing system, the method comprising:
periodically sending checkpoint information from a primary server to a secondary server;
receiving an indication that a state of the distributed computing system has changed;
in response to the indication, determining if there is already a node hosting the primary server for the service; and
if there is not already a node hosting the primary server, selecting a node to host the primary server based upon rank information for the nodes, wherein the rank information specifies whether the selected node is a secondary server which has received the checkpoint information, whereby the secondary server is able to take over for the primary server without having to wait to receive additional configuration information;
wherein selecting a node to host the primary server based upon rank information for the nodes occurs concurrently on all active nodes; and
wherein the identity of the node that hosts the primary server is communicated through a set of lockable, shared candidate variables located on the individual nodes that are accessed remotely by all of the active nodes to disqualify individual nodes from hosting the primary server based upon rank information.

2. The method of claim 1, wherein selecting the node to host the primary server involves:
   assuming that a given node from the plurality of nodes in the distributed computing system hosts the primary server,
   communicating rank information between the given node and other nodes in the distributed computing system, wherein each node in the distributed computing system has a unique rank with respect to the other nodes in the distributed computing system,
   comparing a rank of the given node with a rank of the other nodes in the distributed computing system, and
   if one of the other nodes in the distributed computing system has a higher rank than the given node, disqualifying the given node from hosting the primary server.

3. The method of claim 2, further comprising, if there exists a node that is configured to host the primary server, allowing the node that is configured to host the primary server to communicate with other nodes in the distributed computing system in order to disqualify the other nodes from hosting the primary server.

4. The method of claim 2, wherein assuming that the given node hosts the primary server involves:
   maintaining a candidate variable in the given node identifying a candidate node to host the primary server; and
   initially setting the candidate variable to identify the given node.

5. The method of claim 2, wherein the given node in the distributed computing system can be dynamically configured to act as one of:
   a host for the primary server for the service;
   a host for a secondary server for the service, wherein the secondary server periodically receives checkpointing information from the primary server; and
   a spare for the primary server, wherein the spare does not receive checkpointing information from the primary server.

6. The method of claim 5, further comprising, upon initial startup of the service, selecting a highest ranking spare to host the primary server for the service.

7. The method of claim 5, further comprising allowing the primary server to configure spares in the distributed computing system to host secondary servers for the service.

8. The method of claim 5, wherein comparing the rank of the given node with the rank of the other nodes in the distributed computing system involves considering a host for the primary server to have a higher rank than a host for a space, and considering a host for a secondary server to have a higher rank than a spare.

9. The method of claim 2, wherein disqualifying the given node from hosting the primary server involves ceasing to communicate rank information between the given node and the other nodes in the distributed computing system.

10. The method of claim 1, further comprising, after a new node has been selected to host the primary server, if the new node is different from a previous node that hosted the primary server, establishing connections for the service to the new node.

11. The method of claim 1, further comprising, after a new node has been selected to host the primary server, if the new node is different from a previous node that hosted the primary server, configuring the new node to host the primary server for the service.

12. The method of claim 1, further comprising restarting the service if the service was interrupted as a result of the change in state of the distributed computing system.

13. A computer-readable storage medium storing instructions that when executed by a computer cause the computer to perform a method for selecting a node to host a primary server for a service from a plurality of nodes in a distributed computing system, the method comprising:
   periodically sending checkpoint information from a primary server to a secondary server;
   receiving an indication that a state of the distributed computing system has changed;
   in response to the indication, determining if there is already a node hosting the primary server for the service; and
   if there is not already a node hosting the primary server, selecting a node to host the primary server based upon rank information for the nodes, wherein the rank information specifies whether the selected node is a secondary server which has received the checkpoint information, whereby the secondary server is able to take over for the primary server without having to wait to receive additional configuration information;
   wherein selecting a node to host the primary server based upon rank information for the nodes occurs concurrently on all active nodes; and
   wherein the identity of the node that hosts the primary server is communicated through a set of lockable, shared candidate variables located on the individual nodes that are accessed remotely by all of the active nodes to disqualify individual nodes from hosting the primary server based upon rank information.

14. The computer-readable storage medium of claim 13, wherein selecting the node to host the primary server involves:
   assuming that a given node from the plurality of nodes in the distributed computing system hosts the primary server,
   communicating rank information between the given node and other nodes in the distributed computing system, wherein each node in the distributed computing system has a unique rank with respect to the other nodes in the distributed computing system,
   comparing a rank of the given node with a rank of the other nodes in the distributed computing system, and
   if one of the other nodes in the distributed computing system has a higher rank than the given node, disqualifying the given node from hosting the primary server.

15. The computer-readable storage medium of claim 14, wherein if there exists a node that is configured to host the primary server, the method further comprises allowing the node that is configured to host the primary server to communicate with other nodes in the distributed computing system in order to disqualify the other nodes from hosting the primary server.

16. The computer-readable storage medium of claim 14, wherein assuming that the given node hosts the primary server involves:
   maintaining a candidate variable in the given node identifying a candidate node to host the primary server; and
   initially setting the candidate variable to identify the given node.

17. The computer-readable storage medium of claim 14, wherein the given node in the distributed computing system can be dynamically configured to act as one of:

a host for the primary server for the service;

a host for a secondary server for the service, wherein the secondary server periodically receives checkpointing information from the primary server; and a spare for the primary server, wherein the spare does not receive checkpointing information from the primary server.

18. The computer-readable storage medium of claim 17, wherein upon initial startup of the service, the method further comprises selecting a highest ranking spare to host the primary server for the service.

19. The computer-readable storage medium of claim 17, wherein the method further comprises allowing the primary server to configure spares in the distributed computing system to host secondary servers for the service.

20. The computer-readable storage medium of claim 17, wherein comparing the rank of the given node with the rank of the other nodes in the distributed computing system involves considering a host for the primary server to have a higher rank than a host for a space, and considering a host for a secondary server to have a higher rank than a spare.

21. The computer-readable storage medium of claim 14, wherein disqualifying the given node from hosting the primary server involves ceasing to communicate rank information between the given node and the other nodes in the distributed computing system.

22. The computer-readable storage medium of claim 13, wherein after a new node has been selected to host the primary server, if the new node is different from a previous node that hosted the primary server, the method further comprises establishing connections for the service to the new node.

23. The computer-readable storage medium of claim 13, wherein after a new node has been selected to host the primary server, if the new node is different from a previous node that hosted the primary server, the method further comprises configuring the new node to host the primary server for the service.

24. The computer-readable storage medium of claim 13, wherein the method further comprises restarting the service if the service was interrupted as a result of the change in state of the distributed computing system.

25. An apparatus that selects a node to host a primary server for a service from a plurality of nodes in a distributed computing system, the apparatus comprising:

a sending mechanism configured to periodically send checkpoint information from a primary server to a secondary server;

a receiving mechanism that is configured to receive an indication that a state of the distributed computing system has changed;

a determination mechanism that is configured to determine if there is already a node hosting the primary server for the service in response to the indication;

a selecting mechanism, wherein if there is not already a node hosting the primary server, the selecting mechanism is configured to select a node to host the primary server based upon rank information for the nodes, wherein the rank information specifies whether the selected node is a secondary server which has received the checkpoint information, whereby the secondary server is able to take over for the primary server without having to wait to receive additional configuration information;

wherein selecting a node to host the primary server based upon rank information for the nodes occurs concurrently on all active nodes; and wherein the identity of the node that hosts the primary server is communicated through a set of lockable, shared candidate variables located on the individual nodes that are accessed remotely by all of the active nodes to disqualify individual nodes from hosting the primary server based upon rank information.

26. The apparatus of claim 25, wherein, in selecting a node to host the primary server based upon rank information, the selecting mechanism is configured to:

communicate rank information between the given node and other nodes in the distributed computing system, wherein each node in the distributed computing system has a unique rank with respect to the other nodes in the distributed computing system, and to compare a rank of the given node with a rank of the other nodes in the distributed computing system.

27. The apparatus of claim 26, further comprising a disqualification mechanism that is configured to disqualify the given node from hosting the primary server if one of the other nodes in the distributed computing system has a higher rank than the given node.

28. The apparatus of claim 26, further comprising a mechanism on the primary server that is configured to communicate with other nodes in the distributed computing system in order to disqualify the other nodes from hosting the primary server.

29. The apparatus of claim 26, wherein the selecting mechanism is configured to:

maintain a candidate variable in the given node identifying a candidate node to host the primary server; and to initially set the candidate variable to identify the given node.

30. The apparatus of claim 26, wherein the given node in the distributed computing system can be dynamically configured to act as one of:

a host for the primary server for the service;

a host for a secondary server for the service, wherein the secondary server periodically receives checkpointing information from the primary server; and a spare for the primary server, wherein the spare does not receive checkpointing information from the primary server.

31. The apparatus of claim 30, further comprising an initialization mechanism wherein during initialization of the service, the initialization mechanism is configured to select a highest ranking spare to host the primary server for the service.

32. The apparatus of claim 30, further comprising a promotion mechanism on the primary server that that is configured to promote spares in the distributed computing system to host secondary servers for the service.

33. The apparatus of claim 30, wherein while comparing the rank of the given node with the rank of the other nodes in the distributed computing system, the selecting mechanism is configured to consider a host for the primary server to have a higher rank than a host for a secondary server, and to consider a host for a secondary server to have a higher rank than a spare.

34. The apparatus of claim 26, wherein the selecting mechanism is configured to cease to communicate rank information between the given node and the other nodes in the distributed computing system after the given node is disqualified by the disqualification mechanism.

35. The apparatus of claim 25, further comprising a connection mechanism that is configured to establish connections for the service to a new node after the new node has been selected to host the primary server, and if the new node is different from a previous node that hosted the primary server.

36. The apparatus of claim 25, further comprising a mechanism that configures a new node to host the primary server for the service, after the new node has been selected to host the primary server, and if the new node is different from a previous node that hosted the primary server.

37. The apparatus of claim 25, further comprising a restarting mechanism that is configured to restart the service if the service was interrupted as a result of the change in state of the distributed computing system.

* * * * *

UNITED STATES PATENT AND TRADEMARK OFFICE
CERTIFICATE OF CORRECTION

PATENT NO. : 6,957,254 B1  Page 1 of 1
APPLICATION NO. : 09/662553
DATED : October 18, 2005
INVENTOR(S) : Skef F. Iterum et al.

It is certified that error appears in the above-identified patent and that said Letters Patent is hereby corrected as shown below:

(At column 10, line 49), please delete the words, "that that" and replace with the word --that--.

Signed and Sealed this

Twenty-first Day of August, 2007

JON W. DUDAS
*Director of the United States Patent and Trademark Office*